Patented June 24, 1930

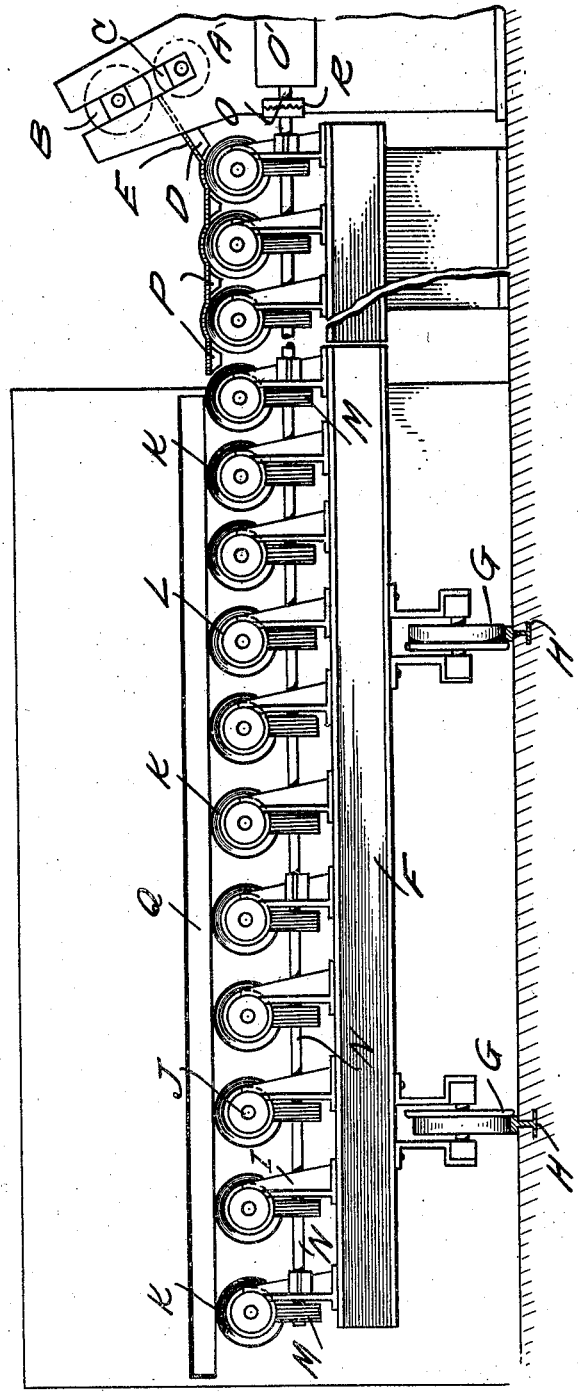

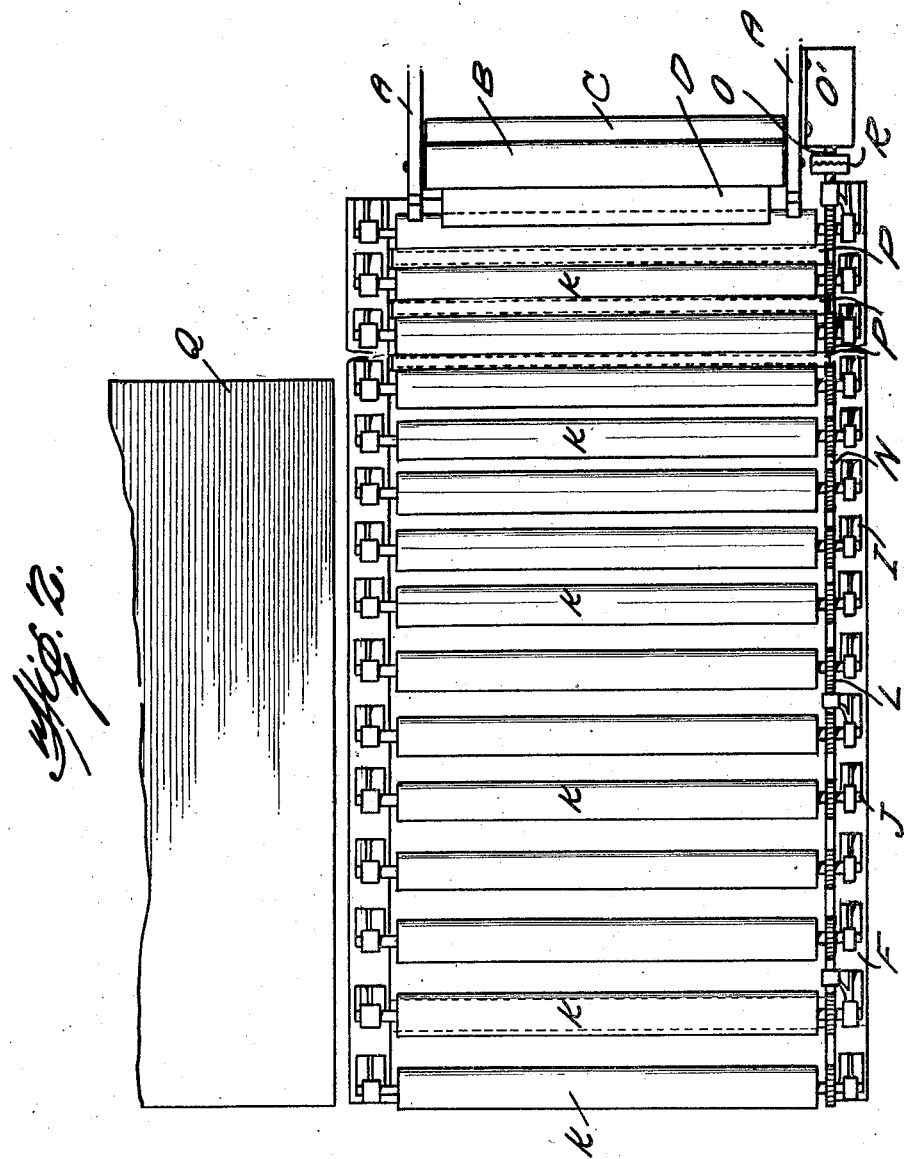

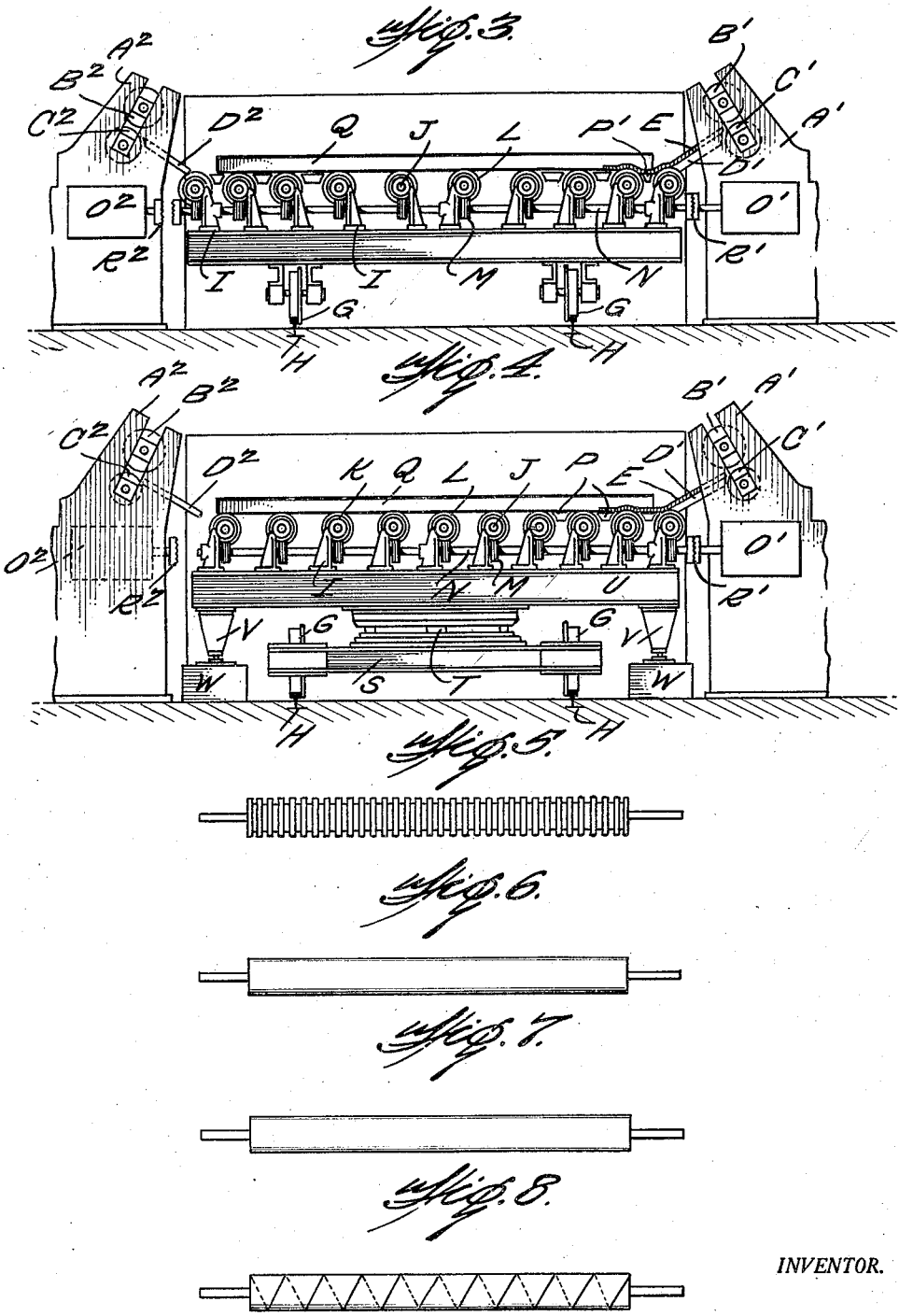

1,767,914

UNITED STATES PATENT OFFICE

LOUIS BOUDIN, OF ST. GOBAIN, FRANCE, ASSIGNOR TO SOCIETE ANONYME DES MANUFACTURES DES GLACES & PRODUITS CHIMIQUES DE SAINT-GOBAIN, CHAUNY & CIREY, OF PARIS, FRANCE

METHOD AND APPARATUS FOR CONVEYING GLASS FROM FORMING DEVICES

Application filed April 4, 1929, Serial No. 352,636, and in France October 30, 1926.

In apparatus hither generally employed for the intermittent manufacture of sheet glass, the means for the reception of each plate or sheet on its discharge from the rolling machine and for the transportation of the sheet to the entrance of the lehrs has been a movable table made of refractory elements mounted on a carriage.

While one sheet is being rolled the table is advanced at a rate of speed at least equal to that of rolling, so as to avoid exerting any force on the glass capable of making folds or creases in the sheets. When this is done the table is stopped opposite the entrance to the lehr and the sheet manually or mechanically shoved from off the table into the lehr, the table then returned to its point of starting for a new operation.

This method of transport presents the following disadvantages:

(1) The slightest roughness or inequality in the upper surface of the refractory elements of the table is imparted to the lower surface of the still plastic glass sheets which makes contact with this refractory material. The result is that the lower surfaces of the sheet are not smooth, but dull and more or less rough.

(2) These alterations of the glass are accentuated by dislocations and fractures of the refractory material of the table apparatus, due to successive heating and cooling and the reciprocatory movements of the table, the result being inequalities in the level of the glass sheets, which frequently cause breakage during transport and use.

(3) In the manufacture of impressed glass the design is dimmed or distorted by reason of the contact of the glass plates with the refractory material, and in some cases counter-reliefs are formed on the non-imprinted surface of the plates.

(4) The operation of the tables and frequent repairs necessary for the refractory covering are the cause of great expense.

(5) The space occupied by the apparatus behind the rolling machine at the beginning of each operation is an inconvenience in glass rolling plants.

The present invention is intended to eliminate these defects.

It consists in replacing the movable table by a series of rollers, actuated mechanically, arranged parallel with the rolling cylinders, and at right angles to the entrance of the lehr, so that the sheets of rolled glass move horizontally over a plane determined by the upper generatrices of the rollers, the peripheral speed thereof during the time the sheet is being fed to the table being equal to or slightly greater than the speed of sheet formation, for the purpose of carrying along the sheets.

Preferably, the axes of the rollers are carried on a chassis which may be fixed or movable, for example, mounted on a carriage which is held stationary during operative periods and which may be moved to facilitate access to the rolling machine and the lehr during inoperative periods.

In order to prevent bending or distortion of the head of each sheet, the spaces between the rollers may be provided, particularly in the first part of the path of the sheets, with filling bars, the upper plane of which is slightly below the plane of the upper generatrices of the rollers, and on which the head of the sheet slides to pass from one to the next roller.

The rollers may be driven either by the elements of the rolling machine, or by the drive mechanism of the latter, or by an independent drive.

These rollers, as well as the filling bars, may be of metal or of a material which is a non-conductor of heat. Their surface may be smooth or provided with portions in relief, so as to reduce the area in contact with the glass. Their surfaces may, for example, be channelled, either axially of the rollers or in a direction perpendicular or inclined with respect to the axis of the rollers and the channels may differ in character and position in each roller. A simple method consists in helically winding on the tubes which form the rollers metal wires welded to said tubes, the direction of the winding differing in different rollers.

Practice has shown:

(1) That with suitable reliefs it is possible to prevent by reason of the continuous movement thereof over the rollers impressions forming on the lower surface of the sheets.

(2) That these reliefs do not set up any resistance to the passage of the plates into the annealing chamber.

By reason of the slight adherence of the glass sheets on the rolls it is possible to insert them into the lehr at the moment in which they arrive opposite the opening thereof without the necessity of stopping or even slowing the rotary movement of the rolls.

The accompanying drawings show by way of example several embodiments of the invention.

Fig. 1 is an elevation and Fig. 2 a plan view of the apparatus embodying my invention, and adapted to carrying out the process hereinafter claimed.

Figs. 3 and 4 are elevations of a structure embodying my invention placed between two rolling machines and adapted to be used with either.

Figs. 5, 6, 7 and 8 illustrate different types of rollers.

A is the rolling machine, such for instance as that known as a Chance machine, of which are shown only the two rolls B and C and the tablet D which supports the glass plate E on its exit from said machine. As is well known forming machines of this kind produce disconnected sheets.

F is the chassis of the table mounted on the wheels G which run on tracks H.

Carried by the chassis are bearings I in which the shafts J of rollers K are mounted. Gears L, keyed to the shafts J, are driven by the worms M on a longitudinal shaft N actuated through the clutch R by a mechanism O which receives its movement either from the machine A or a motor O'. The clutch permits the ready disconnection of parts on the carriage from the forming machine when the former is withdrawn. Filling bars P are placed between the initial rollers K and slightly below the upper surface thereof to support the forward ends of the glass sheets.

Q is the lehr, the entrance to which is opposite the rollers K, which are in front thereof, so that the upper plane of the generatrices of the latter are in the extension of the plane of the floor of the lehr.

The operation is as follows:

The clutch R is engaged, which causes the rotation of the rollers of the apparatus. A quantity of glass sufficient for the formation of a plate is placed in front of the rolls B C of the forming machine. The glass plate E, after passing from the rolls B C, descends onto tablet D and passes over rollers K. The head of the still soft plate is guided by the filling strips P, which prevents it from engaging between the rollers K.

When the sheet rests entirely upon the rollers it is shoved into the lehr, moving parallel with the axes of the rollers, without it being necessary to stop the movement of the latter.

On Fig. 3 the roller apparatus is placed between two forming machines $A_1$ and $A_2$, which may alternately supply sheets to the table and then to the lehr. For this purpose the shaft N has a clutch $R_1$, $R_2$, on each end by which it may be actuated at will by driving mechanism $O^1$ of forming machine $A_1$ or by mechanism $O^2$ of forming machine $A_2$.

The rollers of the table may be thus caused to alternately rotate in one direction and in the other, accordingly as they receive sheets from one or the other of the forming machines.

In order to reduce the number of contact surfaces of the sheets as they become cooled in moving over the apparatus, and thus need less support, the distance between these rollers is increased progressively. This arrangement is not applicable where the apparatus serves two rolling machines except always feeding it from the same end, which may be accomplished by turning it about end for end after having served one machine in order to serve the other.

For this purpose the apparatus may be constructed in two parts, as shown on Fig. 4. The lower part or carriage S, which is mounted on the wheels G, carries a pivot T, about which the upper part of frame U, carrying the rollers K and the drive shaft N, may rotate. Lifting jacks V, suspended to the frame U, permit of holding the apparatus stationary in one or the other of the operative positions, bearing on the sockets W.

By preference the roller bed formed by the rollers K is considerably longer than the sheet to be formed, the forming machine being remote from the side of the lehr, as shown in Figs. 1 and 2, and the motors O, $O^1$ and $O^2$ are a variable speed motor. With such a construction, during the delivery of the sheet the rollers K are driven at a peripheral speed equal to or slightly greater than that of the speed of sheet formation, and after the formation has been completed and the sheet has been delivered to the roller bed, the speed of the driving mechanism, and thus of the forming rolls and of the rollers of the bed is reduced so that the sheet may cool to the desired extent before it is brought opposite the mouth of the lehr in a position to be shoved off into the lehr. Obviously this variation in speed may be dispensed with if the sheet of glass is sufficiently thin, or by making the roller bed of greater length, or by cooling the sheet.

This application contains the full disclosure of my prior application filed Oct. 20, 1927, Serial No. 227,580, and as to such matter is a continuation thereof.

It is understood that the constructional details and operation of the invention, the forms, dimensions, materials used, etc., may vary without departing from the principle of the invention.

Having thus described my invention what I claim is;—

1. The combination with a lehr, of a machine forming discontinuous glass sheets, and mechanism for receiving the sheets therefrom as formed comprising a plurality of rollers driven at a peripheral speed slightly in excess of the speed of sheet formation, located in front of the lehr, and having their axes parallel to the line of feed into the lehr.

2. The combination with a lehr, of a machine for forming discontinuous glass sheets, a mechanism for receiving the sheets therefrom as formed, comprising a movable carriage carrying a plurality of sheet supporting rollers located in front of the lehr and having their axes parallel to the line of feed into the lehr, and means for driving the rollers at a peripheral speed slightly in excess of the speed of the sheet formation comprising a shaft mounted on the carriage and a clutch by which it may be connected to and driven from the drive of the sheet forming mechanism.

3. The combination with a lehr, of a machine forming discontinuous glass sheets, and mechanism for receiving the sheets therefrom as formed comprising a plurality of rollers driven at a peripheral speed slightly in excess of the speed of sheet formation, located in front of the lehr, and having their axes parallel to the line of feed into the lehr, the surfaces of the rolls being channelled.

4. The combination with a lehr, of a machine forming discontinuous glass sheets, and mechanism for receiving the sheets therefrom as formed comprising a plurality of rollers driven at a peripheral speed slightly in excess of the speed of sheet formation, located in front of the lehr, and having their axes parallel to the line of feed into the lehr, the rolls having channelled surfaces, the channels on different rolls running in different directions.

5. The combination with a lehr, of a machine forming discontinuous glass sheets, and mechanism for receiving the sheets therefrom as formed comprising a plurality of rollers driven at a peripheral speed slightly in excess of the speed of sheet formation, located in front of the lehr, and having their axes parallel to the line of feed into the lehr, filling bars being located between the adjacent initial rollers at a level slightly below the upper generatrices thereof.

6. The combination with a lehr, of two machines for forming discontinuous glass sheets, a mechanism for receiving sheets from either of said machines comprising a plurality of sheet supporting rollers located in front of the lehr and between the sheet forming machines, and having their axes parallel to the line of feed into the lehr, and means for driving the rollers at a peripheral speed slightly in excess of the speed of sheet formation, comprising clutches connectable to the drive of either sheet former.

7. The hereinbefore described method of delivering glass sheets from a discontinuous sheet forming machine to a lehr, which comprises receiving the sheets as formed on a series of rollers, conveying the sheets by the rotation of rollers across the mouth of a lehr, and feeding the sheets into the lehr by sliding them on the rolls lengthwise thereof.

8. The hereinbefore described method of delivering glass sheets from a discontinuous sheet forming machine to a lehr, which comprises receiving the sheets as formed on a series of rollers, conveying the sheets by the rotation of rollers across the mouth of a lehr, and feeding the sheets into the lehr by sliding them on the rolls lengthwise thereof while the rollers are rotating.

9. The combination with a lehr, of an intermittent glass sheet forming machine, mechanism for receiving glass sheets therefrom, comprising a roller bed, extending across the entrance of the lehr, and comprising rollers, the axes of which are parallel to the feed through the lehr, and means for driving said rollers at the speed of sheet formation and at a lower speed.

In testimony whereof I hereunto affix my signature.

LOUIS BOUDIN.